March 21, 1950 — E. S. MURRAH — 2,500,999

ELECTRICALLY DRIVEN ROTARY SHEAR

Filed Jan. 17, 1948 — 4 Sheets-Sheet 1

INVENTOR.
Edward S. Murrah
BY
Albert G. Blodgett
Attorney

March 21, 1950  E. S. MURRAH  2,500,999
ELECTRICALLY DRIVEN ROTARY SHEAR
Filed Jan. 17, 1948  4 Sheets-Sheet 3

INVENTOR.
Edmund S. Murrah
BY
Albert G. Blodgett
Attorney

Patented Mar. 21, 1950

2,500,999

UNITED STATES PATENT OFFICE 2,500,999

ELECTRICALLY DRIVEN ROTARY SHEAR

Edmund S. Murrah, Shrewsbury, Mass., assignor to Morgan Construction Company, Worcester, Mass., a corporation of Massachusetts Application January 17, 1948, Serial No. 2,868

6 Claims. (Cl. 164—68)

This invention relates to electrically driven rotary shears, and more particularly to so-called "flying shears" adapted to sever longitudinally moving material.

In the rolling of metal bars and the like it is often desirable to cut a short piece or "crop" from the front end of each bar, usually at some intermediate stage in the rolling process. While steam operated shears have been used heretofore for this purpose, there has long been a demand for a satisfactory electrically driven rotary shear which could be employed instead of a steam shear. However, very difficult problems of acceleration and deceleration are involved and no adequate solution has been found. If for any reason the rolled bar should cobble at a point beyond the shear, it is highly desirable to sever the bar into a series of relatively short pieces and thereby facilitate the clearing of the cobble. In some mills it is desired to cut each bar into several pieces of a predetermined length, and if this length is considerably greater than the so-called "shear circumference" of the rotary shear, it may be necessary to stop the shear between successive cuts. This involves problems similar to those encountered in cutting front crops.

It is accordingly one object of the invention to provide an electrically driven rotary shear adapted to cut a short crop from the front end of each longitudinally traveling bar or the like approaching the shear.

It is a further object of the invention to provide an electrically driven rotary crop shear which will be capable, under manual control, of cutting a cobbled bar or the like into a series of relatively short pieces.

It is a further object of the invention to provide an electrically driven rotary shear adapted to cut a longitudinally traveling bar or the like into predetermined lengths, the shear coming to rest between successive cuts.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a somewhat diagrammatic plan view of a rotary shear and a portion of an associated rolling mill, the shear being arranged for crop and cobble cutting;

Figure 1:
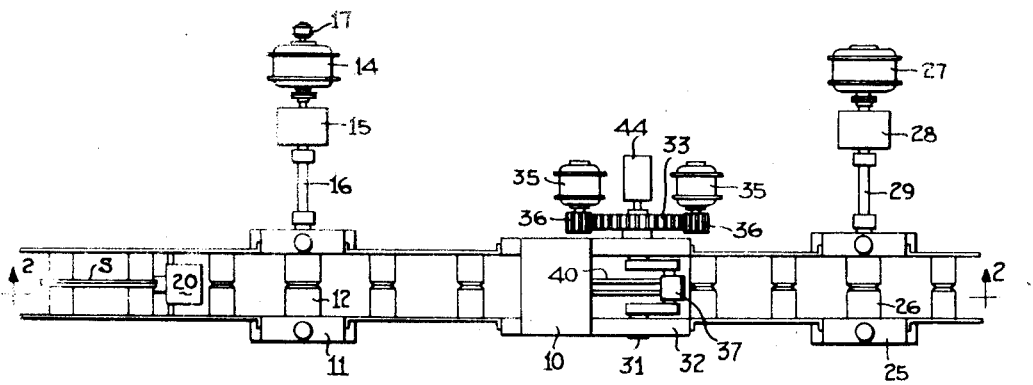
Figure 2:
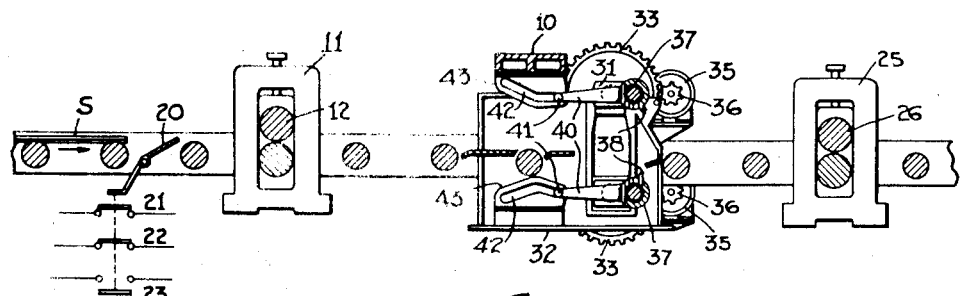
Fig. 2 is a section taken on the line 2—2 of Fig. 1.

Referring first to Figs. 1 and 2, there is provided a rotary shear 10 arranged to crop the front end of a hot metal bar or the like S as it emerges from a rolling mill stand 11 and while a portion of the bar is still between the mill rolls 12. These rolls are driven by an electric motor 14 which is connected to the rolls by the usual mill pinions (not shown) located within a pinion housing 15, and the usual universal spindles 16. The motor 14 also drives a small pilot generator 17. A flag 20 is located in the path of the bar in advance of the shear to control two normally closed switches 21 and 22, and a normally open switch 23. A second rolling mill stand 25 having mill rolls 26 is located beyond the shear. The rolls 26 are driven by an electric motor 27 which is connected to the rolls by mill pinions located within a pinion housing 28, and the usual universal spindles 29.

The rotary shear 10 may be of any suitable type, and for purposes of illustration I have shown a shear constructed in accordance with the disclosure of the patent to Morgan et al., No. 2,157,000, granted May 2, 1939. This shear comprises a pair of opposed horizontal crank shafts 31 rotatably supported in a frame 32 and connected to one another by gears 33. These gears are driven by four electric motors 35 which are connected to the gears by pinions 36. Each crank shaft 31 carries a knife head 37 having a knife 38 thereon, and each knife head has a rearwardly extending tail rod 40 with a roller 41 on its end, the roller being guided in a slot 42 in a stationary plate 43. At each revolution of the crank shafts, the knives 38 will meet to sever the bar as it travels longitudinally between them. For purposes of control, as will be explained hereinafter, a limit switch mechanism 44 is connected to the upper crank shaft 31 to be driven thereby.

The shear crank shafts 31 are held stationary in a predetermined position as the bar S approaches the flag 20, and upon actuation of this flag by the bar certain control apparatus is placed in operation to start the shear and effect a cut, whereupon the shear is brought to rest before a second cut is made. For the purpose of this description, the "cutting position" of the shear is defined as that position of the parts in which the knives 38 are the closest to one another, they usually being slightly overlapped at that time. The knives of course make contact with the bar somewhat before they reach the cutting position, and they must travel somewhat beyond the cutting position before they clear the bar. Thus the crank shafts 31 may travel perhaps sixty degrees between the time the knives first engage the bar and the time the knives clear the bar, and throughout this period it is important that the speed of the knives should match the speed of the bar very closely. This involves very difficult problems of inertia, acceleration, speed control, and deceleration.

In the embodiment illustrated, the starting or "zero" position of the shear is such as to provide for a considerable angular travel of the shear for acceleration thereof before the knives engage the bar, and also for a considerable angular travel of the shear for deceleration thereof after the knives have cleared the bar. For this purpose the zero position is preferably located more than 180 degrees in advance of the cutting position, and during deceleration the shear ordinarily continues to move forwardly for some distance beyond the zero position and then returns to the zero position by reversing its direction of travel. If the zero position is located say 270 degrees in advance of the cutting position, and the shear is reversed at say 180 degrees beyond the zero position, approximately 240 degrees of travel will be available for acceleration before the knives engage the bar, and approximately 240 degrees of travel will be available for deceleration after the knives clear the bar.

Figure 4:
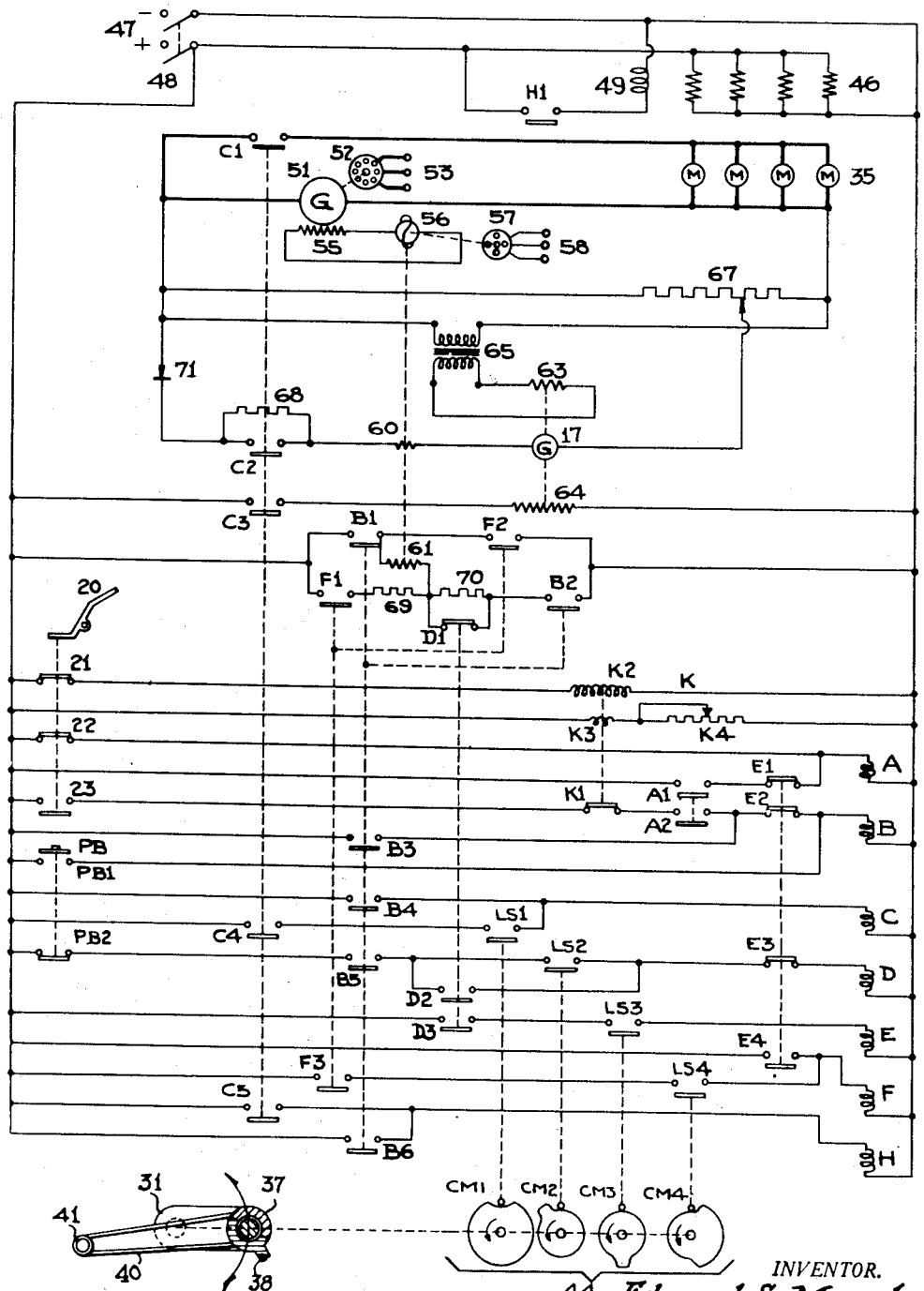
Fig. 4 is an electrical wiring diagram showing one means for driving the shear and controlling the operation thereof.

In Fig. 4 there is illustrated diagrammatically the apparatus whereby the shear may be operated in the desired manner. The fields 46 of the shear motors 35 are connected across a suitable source 47 of constant voltage direct current, under the control of a main switch 48. These motors are provided with the usual mechanical brakes which may be held in the released position by one or more solenoids 49. The armatures of the motors 35 are connected in a circuit with a direct current generator 51 which is driven by a motor 52, this motor being energized from a source 53 of alternating current. The field 55 of the generator 51 is energized by a direct current generator 56 forming a regulating exciter which is driven by a motor 57, this motor being energized from a source 58 of alternating current. The exciter 56 is preferably of the well-known amplidyne type having, in addition to the usual anti-hunt field and load control field (not shown), a control field 60 and a reference field 61. This provides a Ward Leonard or adjustable voltage control for the shear motors 35 so arranged that the speed of these motors will be a function of the voltage supplied by the generator 51, this voltage in turn being under the control of the regulating exciter 56. The reference field 61 is more powerful than the control field 60, and these two fields oppose one another.

In order to control the voltage which is supplied by the exciter 56 to the generator field, certain control apparatus is provided and will now be described. Thus the pilot generator 17 (which is driven by the mill motor 14 of Fig. 1) has two opposed fields 63 and 64. The field 63 is connected in circuit with one winding of a transformer 65, the other winding of the transformer being connected across the terminals of the generator 51. There are also shown four resistances 67, 68, 69, and 70, a rectifier 71, and a push button PB having a normally open switch PB1 and a normally closed switch PB2. A control contactor is provided having a coil A controlling normally open switches A1 and A2. A forward contactor is provided having a coil B controlling normally open switches B1, B2, B3, B4, B5, and B6. A line contactor is provided having a coil C controlling normally open switches C1, C2, C3, C4, and C5. A forward slow down contactor is provided having a coil D controlling a normally closed switch D1 and normally open switches D2 and D3. A stop contactor is provided having a coil E controlling normally closed switches E1, E2 and E3, and a normally open switch E4. A reverse contactor is provided having a coil F controlling normally open switches F1, F2, and F3. A brake contactor is provided having a coil H controlling a normally open switch H1. A timing relay K is provided having a normally closed switch K1, a main pick-up coil K2, a small coil K3 opposed to the coil K2, and a rheostat K4 to control the timing of the relay. The limit switch mechanism 44 includes four switches LS1, LS2, LS3 and LS4, which are controlled by four cams CM1, CM2, CM3 and CM4 respectively arranged to rotate with the shear. If the shear makes a cut at each revolution, as in the particular case illustrated, the cams will rotate at the same speed as the shear. If the shear is arranged to make miscuts and to cut say every two revolutions or every three revolutions, the cams should rotate at one-half or one-third the speed of the shear, respectively.

The electrical connections for the various switches and other devices will now be described. The switch H1 and the solenoid 49 are connected in series across the source 47. The switch C1 is connected in the main circuit of the generator 51. The resistance 67 is connected across the terminals of the generator 51. The rectifier 71, the resistance 68, the field 60, and the generator 17 are connected in series across a portion of the resistance 67. The switch C2 is connected across the resistance 68. The following groups of devices are each connected in series across the source 47: the switch C3 and the field 64; the switch B1, the field 61 (in the "forward" direction), the resistance 70, and the switch B2; the switch F1, the resistance 69, the field 61 (in the "reverse" direction), and the switch F2; the switch 21 and the coil K2; the coil K3 and the rheostat K4; the switch 22 and the coil A; the switches 23, K1, A2, and E2, and the coil B; the switch B4 and the coil C; the switches PB2, B5, LS2, and E3, and the coil D; the switches D3 and LS3, and the coil E; the switch E4 and the coil F; and the switch C5 and the coil H. The switch D1 is connected across the resistance 70. The switches A1 and E1 are connected in series across the switch 22. The switch B3 is connected across the switches 23, K1, and A2. The switch PB1 is connected across the switches 23, K1, A2, and E2. The switches C4 and LS1 are connected in series across the switch B4. The switch D2 is connected across the switch LS2. The switches F3 and LS4 are connected in series across the switch E4. The switch B6 is connected across the switch C5.

It will now be apparent that in the operation of this embodiment of the invention, the switch 48 will be closed, energizing coils K2, K3 and A, opening switch K1 and closing switches A1 and A2. The generator 51 and the exciter 56 will be driven at substantially constant speeds by their respective motors 52 and 57. The pilot generator 17 will be driven at a speed which bears a definite ratio to the speed of the mill rolls 12 and of the bars S issuing therefrom. As the front end of a bar approaches the flag 20, the switch C1 will be open and the shear motors 35 will be stationary. The shear 10 will be stationary, with the crank shafts 31 approximately 90 degrees beyond the cutting position, and the cams CM1, CM2, CM3, and CM4 positioned as shown in Fig. 4. As the front end of the bar engages the flag 20, it will open switches 21 and 22, and close switch 23. As switch 21 opens, coil K2 will be de-energized and its field will gradually decay under the control of the coil K3 and rheostat K4, until the relay times out and switch K1 closes. This will energize the forward contactor coil B, closing switches B1 to B6 inclusive. The closed switches B1 and B2 will energize the reference field 61 in a forward direction, and the closed switch B3 will provide a holding circuit for the coil B. The closed switch B4 will energize the line contactor coil C, closing switches C1 to C5 inclusive. The closed switch B6 will energize the brake contactor coil H, closing switch H1 and energizing the solenoid 49, which will release the brakes for the shear motors. As the switch C1 closes, the shear motors 35 will start in a forward direction and accelerate very rapidly to bring the speed of the shear knives 38 into synchronism with the speed of the bar before the knives have come into contact with the bar perhaps 240 degrees beyond the starting or zero position of the shear. During the continued forward travel of the shear, the knives will cut a crop from the front end of the bar, the length of the crop being dependent upon the adjustment of the timing relay rheostat K4.

During the cut the shear speed is held equal to the bar speed by the action of the regulating exciter 56 in conjunction with the pilot generator 17. The excitation of the pilot generator field 64 is constant. The excitation of the reference field 61 is also constant, during the cut, whereas that of the control field 60 varies with the speed of the pilot generator 17 and with the voltage output of the shear generator 51. Since the two fields 60 and 61 oppose one another, the latter being the greater, the voltage or output of the regulating exciter 56 is a function of the difference between the excitations of these fields. The voltage produced by the pilot generator 17 and the voltage produced by the shear generator 51 act in opposition to one another in controlling the excitation of the control field 60, and the regulating exciter 56 will vary the excitation of the shear generator 51 to maintain a balanced condition such that the shear speed is equal to the bar speed. Thus, if the bar speed should increase ever so little, the pilot generator 17 would provide a greater voltage, in opposition to the shear generator voltage, thus decreasing the excitation of the control field 60, and causing the regulating exciter to increase the excitation of the field 55, which will increase the voltage produced by the shear generator 51 and increase the speed of the shear motors 35.

As the shear reaches bar speed, the voltage produced by the generator 51 will have increased just enough to establish a balanced condition. The function of the rectifier 71 is to block the flow of electricity in one direction, and thereby prevent the control field 60 from being reversed, as might otherwise occur under certain conditions. The purpose of the resistance 68 is to permit a limited flow of current through the control field 60 even with the switch C2 open. The transformer 65 operates only during periods of shear motor acceleration or deceleration, when the voltage applied to the transformer by the shear generator 51 is changing. At such times a current will be induced by the transformer to excite the pilot generator field 63 in such a direction as to oppose the rate of shear motor acceleration or deceleration, as the case may be, and thereby prevent the control from over-shooting. At other times, the field 63 will remain unexcited.

After the shear has traveled approximately 300 degrees from its zero position and the shear knives have cleared the bar, the cam CM2 will close the switch LS2 momentarily, energizing the slow down contactor coil D, opening the switch D1 and closing the switches D2 and D3. As the switch D1 opens, the resistance 70 will become effective to reduce the excitation of the reference field 61, and the shear motor 35 will decelerate very rapidly under the influence of regenerative braking to a low idling speed. The closed switch D2 will provide a holding circuit for the coil D. After the shear has traveled forwardly a total of approximately 540 degrees and thus reached a position approximately 180 degrees beyond the zero position the cam CM3 will close the switch LS3, energizing the stop contactor coil E. This will open the switches E1, E2 and E3, and close the switch E4 to energize the reverse contactor coil F. Coils A, B and D will be de-energized. Switches A1, A2, B1, B2, B3, B4, B5 and B6 will open. Switch D1 will close, and switches D2 and D3 will open. The excitation of the reference field 61 will be reversed, its value being determined by the resistance 69, and the generator field 55 will be reversed. The shear motors 35 will accordingly reverse, and the shear will travel backward at relatively slow speed for approximately 180 degrees to its zero position. As this position is reached, the cams CM1 and CM4 will open the switches LS1 and LS4 respectively. This will de-energize the coils C and F, opening the switches C1 to C5 inclusive and F1 to F3 inclusive. Opening the switch C1 will stop the power supply to the shear motors 35, and opening the switch C5 will de-energize the brake contactor coil H, opening the switch H1, and de-energizing the brake solenoid 49, whereupon the shear motor brakes will bring them to an immediate stop. As the tail end of the bar leaves the flag 20, the switches 21 and 22 will close, and the switch 23 will open. The coil K2 will be energized, and the switch K1 will open. The apparatus will now be in position for the arrival of the front end of the next bar.

Figure 3:
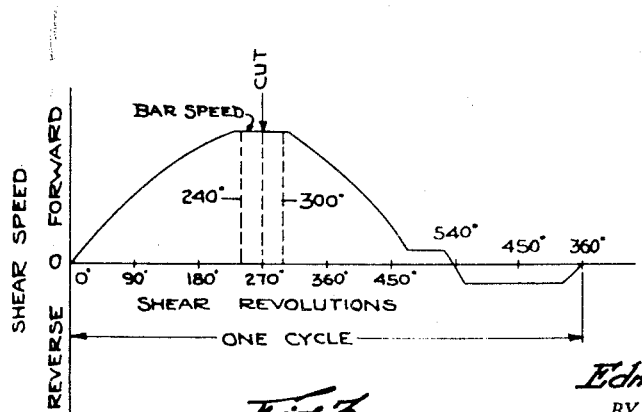
Fig. 3 is a graph showing the relationship of the shear speed to the shear revolutions.

In Fig. 3 there is illustrated a graph in which the shear speed has been plotted against the shear revolutions for one cycle. From this chart it will be clear that from the starting or zero position the shear will accelerate and reach bar speed in somewhat less than 240 degrees, continuing at bar speed through the cut to approximately the 300 degree position, when the knives will be clear of the bar. At this point the shear will decelerate to a forward idling speed, which will be maintained to approximately the 540 degree position. Here the shear will quickly reverse and travel at reverse idling speed for approximately 180 degrees until the original starting position is reached. The net advance movement for each cycle is 360 degrees.

If for any reason the bar S should cobble at some point in the mill beyond the shear 10, it is very desirable to operate the shear continuously and thereby cut the bar into comparatively short lengths. This will greatly facilitate the clearing of the cobble. Preferably the shear is under the direct control of the operator under these conditions. The push button PB provides for such control. If a cobble occurs, the operator will hold this button down, closing the switch PB1 and opening the switch PB2. The closed switch PB1 will energize the forward contactor coil B, and the shear will promptly accelerate to bar speed and continue to operate at that speed so long as the button is held down, the open switch PB2 preventing energization of the slow down contactor coil D. To stop the shear, the operator need merely release the push button, which will open the switch PB1 and close the switch PB2. Upon the next closure of the switch LS2 by the cam CM2, the slow down contactor coil D will be energized, and the shear will decelerate and return by a reverse movement to the zero position.

With the Ward Leonard system and emplidyne control, as described, very rapid changes in shear motor speed are obtainable, and as a result the shear may be used for cutting billets at high speeds. During deceleration of the shear motors, which takes place after each cut, the speed reduction is effected by means of regenerative braking. In other words, when the voltage produced by the generator 51 is reduced the shear will drive the motors 35, which will serve as generators, and they in turn will drive the generator 51, which will serve as a motor to drive the motor 52, the latter operating under these conditions as a generator to return electrical energy to the source 53. Such regenerative braking is very effective in producing extremely rapid deceleration, and it results in a considerable saving in power consumption.

Figure 5:
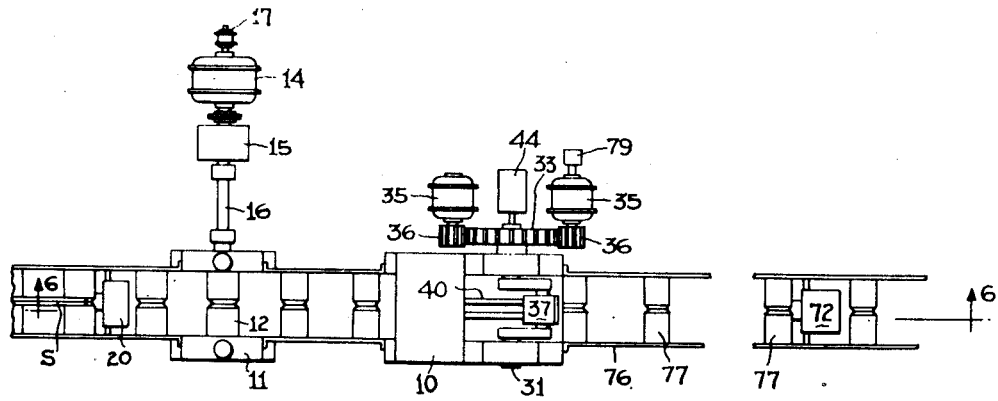
Fig. 5 is a plan view similar to Fig. 1 but showing a rotary shear arranged to cut the product of a rolling mill into predetermined lengths.
Figure 6:
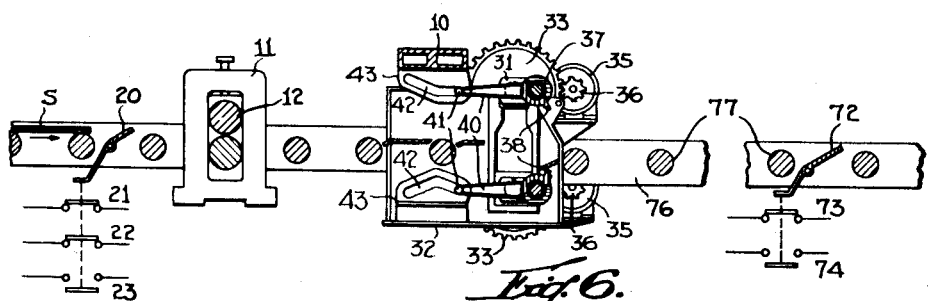
Fig. 6 is a section taken on the line 6—6 of Fig. 5.

In Figs. 5 and 6, the shear 10 is shown arranged to crop the front end of the bar S and then to cut the bar into successive pieces of a predetermined length. In this case the roll stand 11 will be the finishing stand of the mill, and there will be no roll stands beyond the shear. In order to actuate the shear at the proper time for each cut, a flag 72 is provided beyond the shear in position to be depressed by bars traveling thereover, the flag controlling a normally closed switch 73 and a normally open switch 74. The distance from the shear to this flag 72 should be somewhat less than the shortest lengths which are to be cut from the bar. After leaving the shear the bars are supported upon a roller table 76 having driven rollers 77 with a surface speed appreciably greater than the delivery speed of the roll stand 11. This will cause gaps to form between successive pieces of the bar into which the flag 72 may rise. In Fig. 5 there is indicated a small control mechanism 79 connected to one of the shear motors 35. This includes a normally closed switch 80 (Fig. 8) which is opened by centrifugal action whenever the shear motors are operating above a low idling speed.

Figure 8:
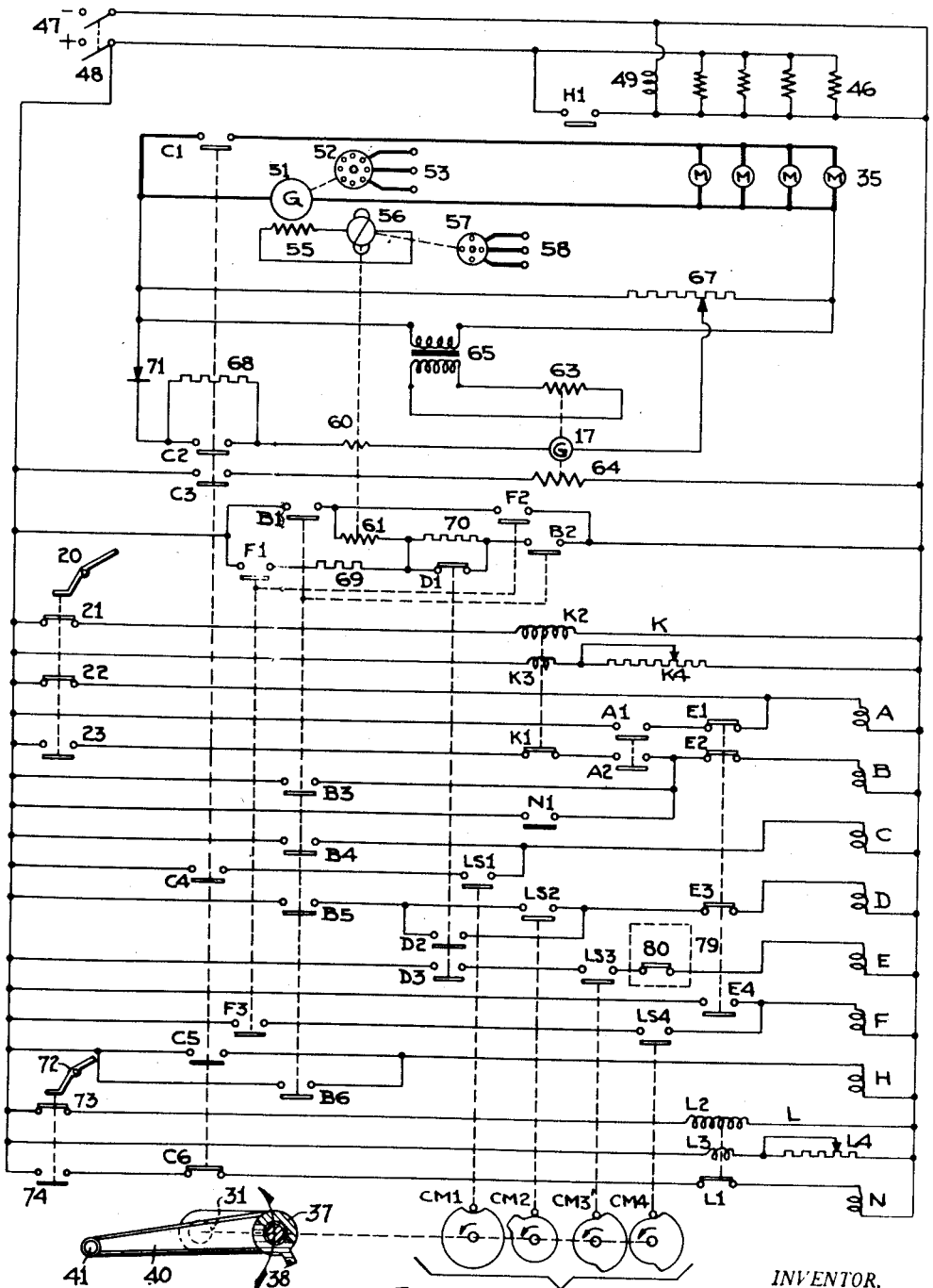
Fig. 8 is an electrical wiring diagram showing one means for driving the shear of Figs. 5 and 6 and controlling the operation thereof.

In Fig. 8 there is shown diagrammatically the apparatus whereby the shear may be operated to cut each bar into pieces of a predetermined length. Since this apparatus differs in only a few respects from that of Fig. 4, only the differences will be described. There being no need for cobble cutting in this embodiment, the push button PB with its switches PB1 and PB2 have been omitted. A normally closed switch C6 is added, this being under the control of the line contactor coil C. A timing relay L is added, this relay including a normally closed switch L1, a main pick-up coil L2, a small coil L3 opposed to the coil L2, and a rheostat L4 to control the timing of the relay. A cut length contactor is added having a coil N controlling a normally open switch N1, this switch being connected across the switch B3. The switch 80 is connected in series with the switch LS3. The following groups of devices are connected in series across the source 47: the switch 73 and the coil L2; the coil L3 and the rheostat L4; and the switches 74, C6 and L1, and the coil N. The cam CM3 is replaced by a modified cam CM3' which will hold the switch LS3 closed for approximately 180 degrees beyond the zero position.

The operation of this embodiment of the invention will now be apparent from the above disclosures. The switch 48 will be closed, energizing coils K2, K3, A, L2, and L3, opening switch K1, closing switches A1 and A2, and opening switch L1. As the front end of an approaching bar depresses the flag 20, the switches 21 and 22 will open, and the switch 23 will close. The coil K2 will be de-energized, and as the relay K times out the switch K1 will close, energizing the forward contactor coil B. This will start the shear in a forward direction, as more fully explained in the description of the operation of the Fig. 4 embodiment. The shear will accelerate to bar speed, cut a crop from the front end of the bar, and as the knives clear the bar the cam CM2 will close the switch LS2 momentarily, thereby energizing the slow down contactor coil D. This will cause the shear motors to decelerate under the influence of regenerative braking. As the shear passes the zero position upon completion of one revolution, the cam CM3' will close the switch LS3, and as soon as the shear has decelerated to a sufficiently low speed for the centrifugal switch 80 to close, the stop contactor coil E will be energized, closing the switch E4 and energizing the reverse contactor coil F. The shear will immediately reverse, and travel backward at relatively low speed until the original zero position has been reached, whereupon it will come to a stop as previously described. Since the switch LS3 does not close, after the cut has been made, until the shear has completed one forward revolution, the shear will not reverse before it has passed the zero position even though it should be sufficiently decelerated to close the switch 80.

Figure 7:
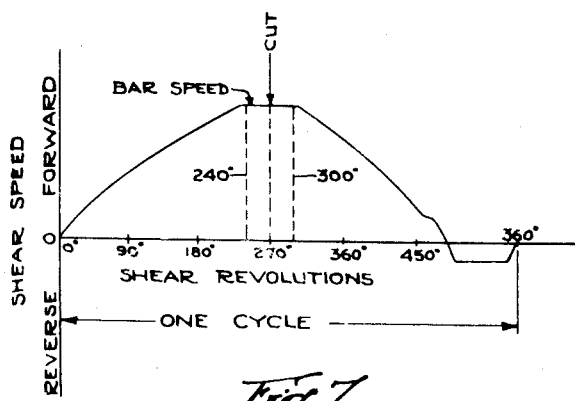
Fig. 7 is a graph showing the relationship of the shear speed to the shear revolutions in the shear of Figs. 5 and 6.

In Fig. 7 there is shown a graph in which the shear speed has been plotted against the shear revolutions for one cycle. As will be noted, this is similar to the graph of Fig. 4 up to the point at which the shear has decelerated to a low speed. Whereas in Fig. 4 the shear continues at idling speed to approximately the 540 degree position before reversal is effected by the cam CM3, in Fig. 7 reversal is effected by the centrifugal switch 80 as soon as the speed is sufficiently reduced. Hence the shear has less distance to travel in reverse to reach the zero position again, and less time will be required to complete the cycle.

After the front end of the bar has been cropped it will continue along the table rollers 77 and depress the flag 72, opening the switch 73 and closing the switch 74. This will de-energize the coil L2, and when the relay L has timed out the switch L1 will close, energizing the cut length contactor coil N and closing the switch N1. This will energize the forward contactor coil B, closing switches B1 to B6 inclusive. Switch B3 will complete a holding circuit for coil B, and switch B4 will energize the line contactor coil B, closing switches C1 to C5 inclusive and opening switch C6 to de-energize the coil N and open the switch N1. The shear will start forwardly, travel through one cutting cycle, and come to a stop just as in the case of the crop cut. The length of the severed piece will be determined by the adjustment of the timing relay rheostat L4. The table rollers 77 will cause the severed piece to travel faster than the main portion of the bar. Hence, as the tail end of the severed piece leaves the flag 72, the flag will rise momentarily into the gap between the pieces, thus closing the switch 73, energizing the coil L2, and opening the switch L1. As the new front end of the bar depresses the flag 72, and the relay L again times out, a new cutting cycle will be initiated. The shear will accordingly continue to make successive cuts on the bar and produce pieces of equal length until the rear end of the bar has passed the shear. When the rear end of the bar leaves the flag 20, this flag will rise into position to be engaged by the front end of the following bar, so that this bar likewise will be cropped and then severed into predetermined lengths.

It will be seen that the invention provides an electrically driven flying shear which may be employed for cutting rapidly traveling bars or the like and brought to rest before a succeeding cut is made. This shear may be used merely for cutting crops from the front ends of the bars, or it may be used to cut the bars into pieces of a predetermined length. When used as a crop shear, a selectively operable manual control is provided whereby the shear may be operated continuously to cut a cobbled bar into short pieces. The apparatus is thoroughly dependable, and it fills a long felt need in the art.

Having thus described my invention, what I claim as new and desire to secure by Letters Patent is:

1. Shearing apparatus comprising a rotary flying shear for cutting longitudinally traveling material, the shear having a cutting position and a starting position in which it may remain stationary between successive cuts, means for feeding material to the shear, an electric motor connected to the shear to drive the same, means establishing a cutting speed for the motor corresponding to the speed of the material, means to accelerate the motor from rest to cutting speed and thereby effect a cut, means to decelerate the motor after each cut and while the shear travels forwardly beyond its starting position, means to reverse the motor before the shear again reaches its cutting position, and means to stop the motor when the reversely traveling shear again reaches its starting position.

2. Shearing apparatus comprising a rotary flying shear for cutting longitudinally traveling material, the shear having a cutting position and a starting position in which it may remain stationary between successive cuts, the starting position being located less than one-half a shear revolution beyond the cutting position, means for feeding material to the shear, an electric motor connected to the shear to drive the same, means establishing a cutting speed for the motor corresponding to the speed of the material, means to accelerate the motor from rest to cutting speed and thereby effect a cut, means to decelerate the motor after each cut and while the shear travels forwardly beyond its starting position, means to reverse the motor before the shear again reaches its cutting position, and means to stop the motor when the reversely traveling shear again reaches its starting position.

3. Shearing apparatus comprising a rotary flying shear for cutting longitudinally traveling material, the shear having a cutting position and a starting position in which it may remain stationary between successive cuts, the starting position being located less than one-half a shear revolution beyond the cutting position, means for feeding material to the shear, an electric motor connected to the shear to drive the same, means establishing a cutting speed for the motor corresponding to the speed of the material, means establishing a relatively low reverse speed for the motor, means to accelerate the motor from rest to cutting speed and thereby effect a cut, means to decelerate the motor by regenerative braking after each cut and while the shear travels forwardly beyond its starting position, means to reverse the motor before the shear again reaches its cutting position and cause the motor to operate at the said reverse speed, and means to stop the motor when the reversely traveling shear again reaches its starting position.

4. Shearing apparatus comprising a rotary flying shear for cutting longitudinally traveling material, the shear having a cutting position and a starting position in which it may remain stationary between successive cuts, means for feeding material to the shear, an electric motor connected to the shear to drive the same, means effective as the front end of the material approaches the shear to accelerate the motor and the shear from rest and thereby cut a relatively short piece from the front end of the material, means to decelerate the motor after each cut and bring the shear to rest in its starting position while the material is still traveling through the shear and before another cut is made, and selectively operable control mechanism effective to cause the motor to drive the shear continuously at substantially the speed of the material and thereby make a series of cuts in rapid succession.

5. Shearing apparatus comprising a rotary flying shear for cutting longitudinally traveling material, the shear having a cutting position and a starting position in which it may remain stationary between successive cuts, the starting position being located less than one-half a shear revolution beyond the cutting position, means for feeding material to the shear, an electric motor connected to the shear to drive the same, a main electric generator connected in circuit with the motor and having a field, means to excite the generator field as required to accelerate the motor and shear from rest to effect a cut, means to reduce the excitation of the generator field after each cut and cause the motor to decelerate by regenerative braking while the shear travels forwardly beyond its starting position, means to reverse the excitation of the generator field before the shear again reaches its cutting position and thereby cause the motor to reverse, and means to stop the motor when the reversely traveling shear again reaches its starting position.

6. Shearing apparatus comprising a rotary flying shear for cutting longitudinally traveling material, the shear having a cutting position and a starting position in which it may remain stationary between successive cuts, the starting position being located less than one-half a shear revolution beyond the cutting position, means for feeding material to the shear, an electric motor connected to the shear to drive the same, a main electric generator connected in circuit with the motor and having a field, a regulating exciter connected in circuit with the generator field and having a field, means to excite the exciter field as required to accelerate the motor and shear from rest to effect a cut, means to reduce the excitation of the exciter field after each cut and cause the motor to decelerate by regenerative braking while the shear travels forwardly beyond its starting position, means to reverse the excitation of the exciter field before the shear again reaches its cutting position and thereby cause the motor to reverse, and means to stop the motor when the reversely traveling shear again reaches its starting position.

EDMUND S. MURRAH.

REFERENCES CITED

The following references are of record in the file of this patent:

UNITED STATES PATENTS

| Number | Name | Date |
|---|---|---|
| 1,680,048 | Iversen | Aug. 7, 1928 |
| 2,193,259 | Sheperdson | Mar. 12, 1940 |